Patented July 25, 1933

1,919,502

UNITED STATES PATENT OFFICE

ELMER M. DAVIS, OF CHICAGO, ILLINOIS, ASSIGNOR TO SWIFT AND COMPANY, OF CHICAGO, ILLINOIS, A CORPORATION OF ILLINOIS

METHOD OF NEUTRALIZING BUTTER FAT

No Drawing.   Application filed February 4, 1932. Serial No. 590,992.

This invention relates to methods of manufacturing butter and particularly to a method of neutralizing butterfat.

One of the objects of this invention is to provide a method for treating butter which has become acid, in order that the butter may be utilized in the manufacture of first-quality butter. Another object of the invention is to neutralize and render palatable, butter which has become acid for various reasons. Other objects of the invention will become apparent from the specification and claims which follow.

In the manufacture of butter from sour or acid cream, the cream is placed into a vat, and lime or soda solution is added to the cream, until the cream reaches the degree of acidity that is desired. The neutralized cream is then pasteurized by any ordinary method, such as the vat method or flash method. The vat method of pasteurizing involves the heating of the cream to a temperature of about 145° Fahr. and keeping the cream at that temperature for 30 minutes or so and then cooling the product. The flash method involves bringing the product to a temperature of about 180° Fahr. momentarily.

It is well known that butter not only acquires unpleasant flavors and odors by reason of changes in the small remnants of other substances besides butter fat which are derived from milk, but also by reason of the capacity of butter oil for absorbing odors and flavors from entirely different substances and from the atmosphere. It is well known that unpleasant odors and flavors in the butter are often resident in small remnants of substances derived from the milk, other than the butterfat globules. Consequently, the manufacture of a first-quality product would seem to require the elimination of such substances, which are usually in the form of a curd.

The present invention offers a simple and effective method of removing such curd.

In practicing the present invention, I take butter that has been neutralized, pasteurized and churned, and from which the buttermilk has been removed. In the case of the usual product I then add sodium phosphate, for example two or three pounds of tri-sodium phosphate to the wash water and wash the butter in this water. The tri-sodium phosphate present in the water softens the curd such that the curd will dissolve and go into the wash water in solution. I have found by experiment that soda has a tendency to soften the curd and that lime has a tendency to harden the curd. For this purpose I have found that tri-sodium phosphate is a milder alkali than the other alkalis, such as soda ash, bi-carbonate of soda, or lime.

If tri-sodium phosphate is not added to the wash water, the water does not dissolve the curd and the curd consequently does not go into solution into the wash water so that it can be drained off.

I have found that in some cases two or three pounds of tri-sodium phosphate, which is ordinarily sufficient for the usual batch of 150 pounds of butter is not enough to properly soften the curd and I have on occasions used seven to ten pounds or more. The use of too large a quantity of tri-sodium phosphate, however, results in softening the butterfat globules rendering it difficult to harden the butter in order to remove it from the churn. Too small an amount of tri-sodium phosphate is insufficient to dissolve the curd. After treating the butter in this way, I remove from the churn, salt and work it in the regular way and then add it to the butter in a regular churning of No. 1 cream. In some cases I have found it advantageous to add starter to the butter after it has been treated with tri-sodium phosphate and then work the starter into the butter without adding salt. In such cases I permit the butter to remain in the cooler at a temperature of about 34° Fahr. or higher, for four or five days or longer and then add 150 pounds of butter treated in this manner to a churning of No. 1 cream, after which the product is churned in the regular way.

Where the butter is treated with tri-sodium wash water after starter has been added, I do not add salt, since this would interfere with the action of the starter. After washing, the starter butter is held in the butter cooler for at least four or five days.

The starter to which refrence has just been made is a commercial lactic acid starter which is added to the milk to coagulate it, and the milk is then added to the cream before churning to give the flavor that is desired in the final butter product.

I have found that a very excellent product may be produced by adding the starter direct to the butter, working the starter in well and then treating the butter with tri-sodium phosphate in the manner which has already been described. Butter so treated may be held as long as desired, but preferably sufficiently long enough to develop the desired flavor, after which the butter so treated may be added to the regular churning. I have secured satisfactory results by adding butter treated in this manner to the regular churning in the percentage of from 5% to 25% of this starter butter to No. 1 cream which is churned in the regular way.

In describing my invention thus far I have made particular reference to tri-sodium phosphate, that is, normal sodium orthophosphate, $Na_3PO_4.12H_2O$ (tribasic). It will be understood, of course, that my invention may be equally as well carried out with the use of any sodium phosphate. For example, di-sodium-hydrogen orthophosphate $Na_2HPO_4$, $12H_2O$, or also by the use of sodium di-hydrogen $NaH_2PO_4H_2O$ (monobasic).

I claim:

1. The process of treating butter which comprises neutralizing, pasteurizing, churning, and removing the buttermilk, adding sodium-phosphate to the wash water, washing the churned butter in the wash water, salting and working, and adding the resultant butter to normal cream for churning therewith.

2. The process of treating butter which comprises neutralizing, pasteurizing, churning, and removing the buttermilk, adding starter and working in said starter, and after adding sodium phosphate to wash water, washing the butter in said wash water, storing the butter in a cool place until the desired flavor is secured and adding said butter to a churning of normal cream.

ELMER M. DAVIS.